United States Patent [19]

Schoeffler et al.

[11] 4,302,022

[45] Nov. 24, 1981

[54] HIGH-LOW TRAILER

[76] Inventors: William N. Schoeffler; Romona B. Schoeffler, both of 3600 Simcoe, Apt. 8, Lafayette, La. 70501

[21] Appl. No.: 108,953

[22] Filed: Dec. 31, 1979

[51] Int. Cl.³ .................................................. B60P 1/02
[52] U.S. Cl. .............................. 280/43.19; 280/423 B; 414/495
[58] Field of Search ............... 280/43.17, 43.19, 43.22, 280/43.23, 423 R, 423 B, 425 R, 425 A, 80 R, 81 R; 414/495

[56] References Cited

U.S. PATENT DOCUMENTS

| | | | |
|---|---|---|---|
| 2,687,225 | 8/1954 | Martin | 280/425 A X |
| 3,063,737 | 11/1962 | Coughran | 280/43.23 X |
| 3,429,585 | 2/1969 | Ross | 280/423 B |

Primary Examiner—Joseph F. Peters, Jr.
Assistant Examiner—Randall A. Schrecengost
Attorney, Agent, or Firm—Bacon & Thomas

[57] ABSTRACT

A trailer bed having ground wheels at the rear and tractor engaging means at the front is formed of front and rear portions joined together by pivoted links, the rear portion being vertically movable relative to the front portion and the wheels to convert the trailer from a low-bed stepped configuration to a continuous flat bed configuration, and vice versa. A single cable is trained over pulleys on the bed portions and wheel mounts to effect simultaneous lifting or lowering of both ends of the rear bed portion.

6 Claims, 4 Drawing Figures

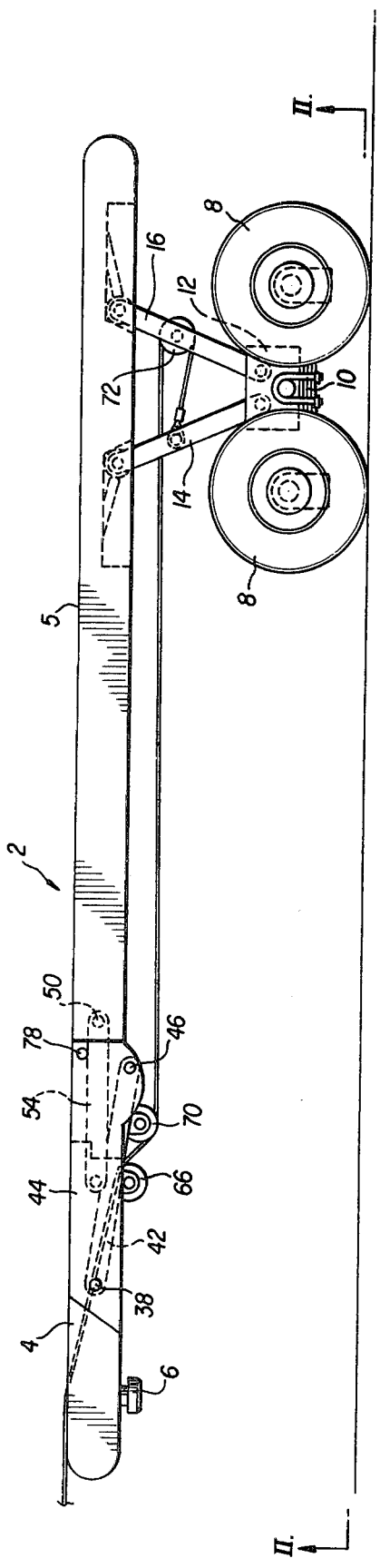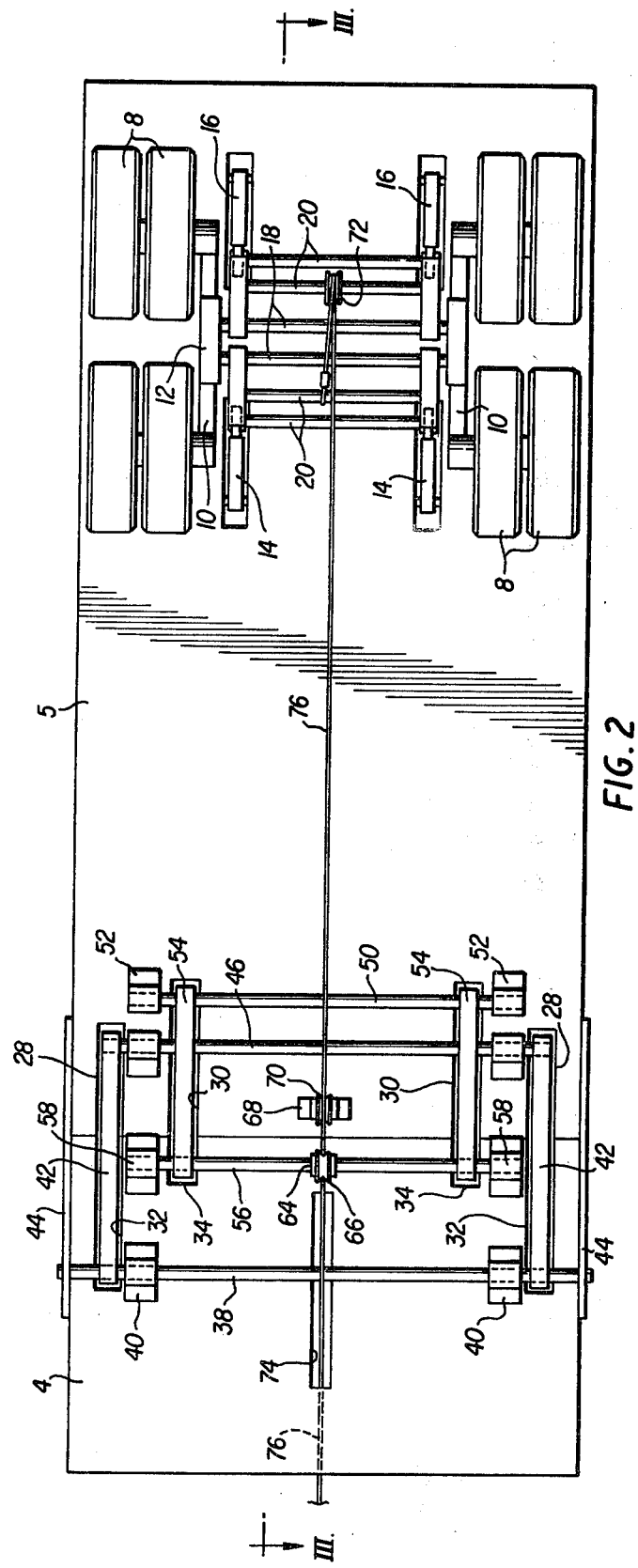

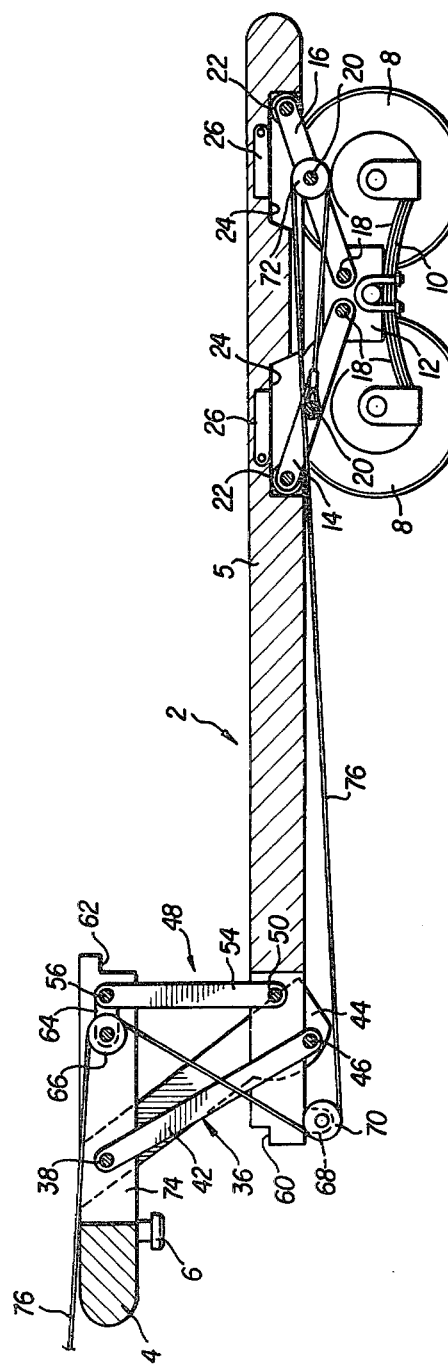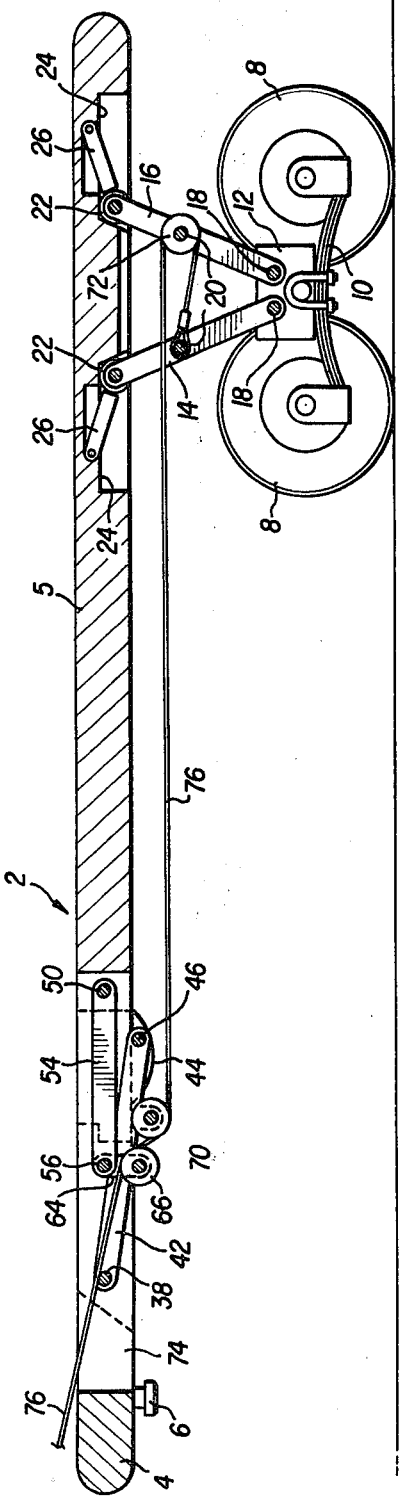

HIGH-LOW TRAILER

BACKGROUND OF THE INVENTION

This invention is in the field of cargo-carrying trailers and particularly trailers that are vertically adjustable.

Most trucks and trailers today are individually owned and are operated on a lease and percentage basis, particularly in oil field equipment handling. The majority of truckers around the oil fields own only one truck and one type of trailer although there are various types and sizes of loads to be handled in oil fields. A flat-bed type trailer cannot haul an overly high load such as a substructure for drilling rigs whereas a trailer suitable for hauling such structures cannot easily haul lengths of pipe or casing since the hauling of such on a short but low-bedded trailer is considered dangerous. Most truckers cannot afford to own different types of trailer.

It has been proposed heretofore to construct trailers, the beds of which can be elevated or lowered but principally for the purpose of convenience in loading heavy cargo on the trailer, then lifting it to a suitable height for transportation. See, for example, the following U.S. patents:

U.S. Pat. No. 2,475,443—Bill
U.S. Pat. No. 3,429,585—Ross
U.S. Pat. No. 3,517,944—Hage
U.S. Pat. No. 4,003,583—Stanzel
U.S. Pat. No. 4,050,707—Glumac
U.S. Pat. No. 4,061,353—Kingman et al The above patents, however, do not disclose trailers that can be converted from a low-bed trailer suitable for hauling bulky loads to a flat-bed trailer suitable for hauling long lengths of pipe or casing or the like.

SUMMARY OF THE INVENTION

The present invention comprises a trailer body formed of front and rear sections of generally planar construction that can be arranged in an upper position wherein their upper surfaces are coplanar and define a flat-bed trailer suitable for hauling long loads such as pipe casing. The front and rear portions of the trailer can be relatively moved vertically so that the forward portion remains attached at the given level to the tractor whereas the lower portion may be lowered relative to both the forward portion and its own supporting wheels to define a low-bedded truck of stepped configuration.

It is therefore an object of this invention to provide a convertible trailer that may selectively be configured as a flat-bed trailer or as a stepped low-bed trailer by a simple manipulation of a suitable single operating means.

BRIEF DESCRIPTION OF THE DRAWINGS

FIG. 1 is a schematic side view of a trailer embodying the present invention and showing it in its upper or flat-bed configuration;

FIG. 2 is a bottom view of the trailer of FIG. 1 as seen from the line II—II of FIG. 1;

FIG. 3 is a vertical sectional view taken substantially along the line III—III of FIG. 2 showing the trailer in a first configuration; and FIG. 4 is a view similar to FIG. 3 but showing the parts in the flat-bed trailer configuration of FIG. 1.

DESCRIPTION OF A PREFERRED EMBODIMENT

In the Figures many of the parts are shown only schematically, it being understood that other structural details may be ultimately employed. For example, in FIGS. 1, 3 and 4 of the drawings, the trailer bed is shown as a solid structure whereas in actual practice it would undoubtedly be constructed of an assembly of beams and panels or the like. However, for the purpose of the present description, a solid-bed structure is adequate.

As shown in FIG. 1, the trailer bed 2 comprises a forward portion 4 and a rear portion 5. The forward and rear portions are separately formed but can be arranged in the coplanar relation shown in FIG. 1 to define a flat-bed trailer. The forward portion 4 is provided with a suitable means 6 for connecting the trailer to a tractor in the conventional manner.

The rear portion of the trailer is supported by ground wheels 8 journalled at the ends of springs 10 (see FIGS. 3 and 4) clamped to a suitable carriage structure 12. Pivoted to the carriage structure 12 are struts 14 and 16. The struts 14 being forward struts and the struts 16 being rearward. Each of the struts is pivoted to the carriage 12 on suitable pivot axes 18. As best shown in FIG. 2, the struts 14 and 16 are of substantial width, each comprising two laterally spaced bars and connecting rods 20. The struts 14 and 16 extend upwardly from the carriage 12 in diverging relation and their upper ends are provided with rollers 22 suitably guided in trackways or guide slots 24 in the rear portion of the trailer bed. Thus, the upper ends of the struts 14 and 16 may be brought into relatively close relationship as shown in FIG. 4 to thus increase the height of the bed portion 5 above the wheels or to a widely separated position as shown in FIG. 3 to lower the bed portion 5 to a lower configuration. Latch elements 26 are pivoted to the rear portion of the trailer bed and are gravity responsive to normally drop to the position shown in FIG. 4. Thus, when the rear trailer portion 5 is lifted to the position shown in FIG. 4, the latches 26 drop behind the rollers 22 and lock the struts 14 and 16 in the position shown in FIG. 4 to thus prevent lowering of the bed portion 5 under the influence of gravity and any load placed thereon.

The forward end of the bed portion 5 is provided with longitudinal slots 28 and 30, see FIG. 2, and the rear or aft portion of the bed portion 4 is provided with longitudinal slots 32 aligned with the slots 28 of the rear bed portion. The front bed portion 4 is also provided with short slots 34 aligned with the slots 30 of the rear bed portion, all as seen best in FIG. 2 of the drawings. A first or forward link means 36 is constituted by a transverse shaft 38 journalled in blocks 40 inset into the underside of the front bed portion 4. Link elements 42 are fixed at one end to the shaft 38 and can swing into the aligned slots 32 and 28 when the trailer is in the position of FIGS. 1 and 4. The shaft 38 extends outwardly of the side edges of the trailer bed and at its outer end has fixed thereon side plates 44. Thus, the side plates 44 will always be parallel to the link members 42. The other ends of link members 42 are carried by a transverse shaft 46 likewise journalled in blocks 48 inset into the bottom of the rear trailer bed portion 5. The links 42 being mounted on the ends of the shafts 46.

A second link means 48 includes a transverse shaft 50 journalled in blocks 52 inset into the bottom of the rear trailer bed portion 5 and mounted on the shaft 50 are link bars 54 which extend along the slots 30 and 34 when the trailer parts are in the position of FIGS. 1 and 4. The other ends of the link bars 54 are carried by a transverse shaft 56 journalled in blocks 58 inset into the bottom of the front trailer bed portion 4. By the structure thus described, it will be apparent that the rear trailer bed portion 5 can be swung by pivoting the links 36 and 48 from the position of FIG. 3 to the position of FIG. 4.

The forward end of the rear trailer bed portion 5 is provided with a notch defining a shoulder 60 complementary to a shoulder 62 formed on the rear edge of the front trailer bed portion 4. Thus, when the parts are in the position of FIGS. 1 and 4, the shoulders 60 and 62 constitute interengaging abutments to limit upward movement of the forward end of the trailer bed portion 5.

A hanger 64 is pivotally supported by the shaft 56 intermediate its ends and is in the form of a yoke supporting a pulley 66. A bracket 68 is fixed to the bottom of the rear trailer bed portion 5 and is also in the form of a yoke journalling a second pulley 70. A pulley 72 is journalled on the rear strut 16 of the wheel support intermediate the ends of the cross rod 20 as shown in FIGS. 2 and 4. A further slot 72 is provided in the forward trailer bed portion 4 intermediate or midway between the side edges thereof and a suitable cable or similar filamentary member 78 extends through the slot 72 and is trained over the pulley 68 then under the pulley 70, as seen in FIGS. 3 and 4. The cable 78 is then extended rearwardly over the pulley 72 then forwardly and is anchored to the cross rod 20 of the forward strut structure 14, all as clearly shown in FIGS. 2 and 4. It is contemplated that the forward end of the cable 78 will be attached to any suitable hydraulic motor or tractor-carried winch or the like capable of applying sufficient tension thereto.

Assume the parts to be in the position shown in FIG. 3 and that it is desired to convert the trailer to a flat-bed trailer of the type shown in FIG. 1. To accomplish this purpose tension is applied to the cable 76 and as will be obvious from FIG. 3, an upward thrust is applied to the pulley 66 and thus to the forward end of the rear trailer bed portion 5 and at the same time a force will be applied between the struts 14 and 16 tending to draw them together. As the cable 76 is drawn frowardly by the winch or the like, the parts are lifted to the position shown in FIG. 4 whereupon the latches 26 drop behind rollers 22 and lock the wheels in their lower position as shown. The side plates 44, previously described, may also be provided with a further opening 78 to be aligned with a corresponding opening in the edge of the trailer bed portion 5 so that a pin can be placed therein to lock the parts in the position shown in FIG. 4. Obviously, such pin must be removed before the rear trailer bed portion 5 is lowered to the position of FIG. 3.

While a single specific embodiment of the invention has been shown and described, it is to be understood that the showing herein is merely schematic and that other forms may be resorted to within the scope of the appended claims. For example, the cable 76 could be replaced by suitable hydraulic devices for drawing the struts 14 and 16 together and for lifting the forward end of the trailer bed portion 5 upwardly.

What is claimed is:

1. A trailer convertible from a stepped low bed trailer to a high flat bed trailer comprising:

a trailer body having a front bed portion provided with means for attaching the same to a tractor and a rear bed portion having ground wheels journalled thereon;

connecting means connecting said front and rear bed portions for relative vertical movement from a first position wherein said rear portion is lower than said front portion to a second position where said front and rear portions are substantially coplanar and define a continuous flat bed;

means for elevating and lowering said rear portion relative to said wheels; and operating means for simultaneously moving the forward and aft ends of said rear bed portion vertically relative to said front bed portion, said means for elevating and lowering said rear bed portion comprising a carriage on which said wheels are journalled, front and rear struts pivoted to said carriage, at their lower ends, and having their upper ends slidably guided on said rear portion for movement toward and from each other.

2. A trailer as defined in claim 1 wherein said connecting means comprise spaced front and rear link means, each pivoted at its ends to front and rear bed portions respectively.

3. A trailer as defined in claim 1 including gravity responsive locking means for automatically locking the upper ends of said struts against movement away from each other when said upper ends have been moved toward each other to elevate said rear bed portion to said second portion.

4. A trailer as defined in claim 1 wherein first pulley means are mounted on said front and rear bed portions, adjacent said links, and a second pulley means is mounted on at least one of said struts, said operating means comprising a single cable connected at one end to the other of said struts and being trained over said first and second pulley means, the arrangement being such that tension in said cable serves to raise both the forward and aft ends of said rear bed portion.

5. A trailer as defined in claim 2 wherein one of said link means includes link portions at the outer edges of said front and rear bed portions and means for locking said link portions against pivoting relative to at least one of said front and rear bed portions when said front and rear bed portions define said continuous flat bed.

6. A trailer as defined in claim 1 wherein the forward end of said rear bed portion and the aft end of said forward bed portion define mutually engageable abutments for limiting uwpard movement of said rear bed portion to said second portion.

* * * * *